United States Patent
Park et al.

(10) Patent No.: US 10,083,373 B2
(45) Date of Patent: Sep. 25, 2018

(54) METHODS, APPARATUSES, SYSTEMS, AND NON-TRANSITORY COMPUTER READABLE MEDIA FOR IMAGE TREND DETECTION AND CURATION OF IMAGE

(71) Applicant: NAVER Corporation, Seongnam-si, Gyeonggi-do (KR)

(72) Inventors: Jongjin Park, Seongnam-si (KR); Gunhan Park, Seongnam-si (KR); Jeanie Jung, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 0 days.

(21) Appl. No.: 15/336,871

(22) Filed: Oct. 28, 2016

(65) Prior Publication Data

US 2017/0124427 A1 May 4, 2017

(30) Foreign Application Priority Data

Oct. 28, 2015 (KR) .................. 10-2015-0149923

(51) Int. Cl.
*G06K 9/62* (2006.01)
*G06K 9/00* (2006.01)

(52) U.S. Cl.
CPC ........ *G06K 9/6226* (2013.01); *G06K 9/00711* (2013.01); *G06K 9/00718* (2013.01); *G06K 9/622* (2013.01); *G06K 2209/27* (2013.01)

(58) Field of Classification Search
None
See application file for complete search history.

(56) References Cited

U.S. PATENT DOCUMENTS

2007/0180482 A1* 8/2007 Frink ............... G08B 13/19656
725/105
2008/0288523 A1* 11/2008 Blose .................. G06F 17/3028

FOREIGN PATENT DOCUMENTS

| JP | 2010-218181 A | 9/2010 |
| KR | 2008-0028574 A | 4/2008 |
| KR | 10-0827198 B1 | 5/2008 |
| KR | 2010-0052676 A | 5/2010 |

OTHER PUBLICATIONS

Korean Office Action dated Oct. 20, 2016 by the Korean Patent Office corresponding to Korean patent application No. 10-2015-0149923.

* cited by examiner

*Primary Examiner* — Stephen Coleman
(74) *Attorney, Agent, or Firm* — Harness, Dickey & Pierce, P.L.C.

(57) ABSTRACT

Provided are methods, apparatuses, systems, and non-transitory computer readable media for image trend detection and curation. A method includes collecting image content created in association with each of events and performing image clustering with respect to each of the events; detecting information about a representative event that represents an image trend based on a cluster according to the image clustering; and providing information about the representative event to an electronic device, in response to a service request received from the electronic device over a network.

19 Claims, 13 Drawing Sheets

METHODS, APPARATUSES, SYSTEMS, AND NON-TRANSITORY COMPUTER READABLE MEDIA FOR IMAGE TREND DETECTION AND CURATION OF IMAGE

CROSS-REFERENCE TO RELATED APPLICATION(S)

This U.S. non-provisional application claims the benefit of priority under 35 U.S.C. § 119 to Korean Patent Application No. 10-2015-0149923 filed on Oct. 28, 2015, in the Korean Intellectual Property Office (KIPO), the entire contents of which are incorporated herein by reference.

BACKGROUND

Field

One or more example embodiments relate to technology for analyzing image-based content created by a user and automatically detecting an image trend.

Description of Related Art

A sudden increase in users of high-speed communication networks has spurred the development of new network based services through communication networks and provided for a diversity of service items. Currently, a video providing service may be one of the most used general services using communication networks among various image-based services.

For example, the conventional art includes technology for providing a video link service capable of viewing a video linked on the Internet using a mobile communication terminal.

According to the conventional art, a broadcast program is transmitted and/or a video of a celebrity or a popular event on a website/mobile site is posted, users may create scenes of interest in the form of captured images, GIFs, etc., and may distribute such images through a variety of communication network based media, for example, cafés, blogs, mails, messengers, etc. Also, with the distribution of smart devices, digital cameras, and the like, users may readily take videos at events, such as a concert, a fan meeting, a festival, and the like. In this case, in addition to an original video, primary scenes may be converted to be in the form of captured images, GIFs, and the like, and be shared between users.

While contents of captured images, GIFs, etc., may be posted as Internet information and/or shared between users, valuable data included in the contents may not be readily utilized.

SUMMARY

One or more example embodiments provide methods, apparatuses, systems, and/or non-transitory computer readable media that may automatically detect an image trend by analyzing image-based content created by a user, and may visualize and curate the detected image trend.

According to an aspect of at least one example embodiment, there is provided a method, the method including collecting, using at least one processor, a plurality of image content associated with at least one event, performing, using the at least one processor, image clustering with respect to the at least one event, detecting, using the at least one processor, information about a representative event that represents an image trend based on a cluster according to the image clustering, and providing, using the at least one processor, the detected information about the representative event to an electronic device in response to a service request regarding the representative event received from the electronic device over a network.

The performing of the image clustering may include collecting the image content at intervals of a desired unit time, and performing the image clustering at the desired unit time. The detecting may include detecting information about the representative image as the image trend associated with the desired unit time using a cluster of the image content collected at the desired unit time.

The performing of the image clustering may include searching for a plurality of documents associated with the event on the Internet, and collecting at least one image included in the retrieved plurality of documents.

The event may be video content, and the performing of the image clustering may include searching for a plurality of documents associated with the video content on the Internet, and collecting at least one image included in the retrieved plurality of documents.

The performing of the image clustering may include collecting metadata associated with the image content; and labeling a corresponding cluster using at least one keyword based on an appearance frequency of the at least one keyword included in the collected metadata.

The detecting may include selecting at least one event as the representative event based on at least one of a total number of clusters corresponding to each event and a total number of images corresponding to each event.

The detecting may include generating a result based on a total number of images of a representative cluster between the events, and selecting at least one event as the representative event, the representative event being the event including a largest total number of images.

The detecting may include selecting at least one event as the representative event based on a total number of images of a representative cluster that is a cluster including a largest total number of images among clusters for each event; and selecting at least one image among the images included in the representative cluster of the representative event as the representative image of the representative event.

The selecting as the representative image of the representative event may include measuring a similarity between images included in the representative cluster and selecting the representative image based on the measured similarity.

The selecting as the representative image of the representative event may include calculating a feature vector of each of the images included in the representative cluster, calculating an average vector of the calculated feature vectors, and selecting the representative image based on a distance between the feature vector of each of the images and the average vector.

The providing may include visualizing and providing information about the representative event for each timeline of the desired unit time.

According to another aspect of at least one example embodiment, there is provided a non-transitory computer-readable recording medium storing computer readable instructions, which when executed by at least one processor, may cause the at least one processor to collect a plurality of image content associated with at least one event, perform image clustering with respect to the at least one event, detect information about a representative event that represents an image trend based on a cluster according to the image clustering, and provide the detected information about the representative event to an electronic device in response to a service request regarding the representative event received from the electronic device over a network.

According to another aspect of at least one example embodiment, there is a system that may include a memory having computer readable instructions stored thereon, and at least one processor configured to execute the computer readable instructions to collect a plurality of image content associated with at least one event, detect information about a representative event that represents an image trend based on a cluster according to the image clustering, and provide the detected information about the representative event to an electronic device in response to a service request regarding the representative event received from the electronic device over a network.

The at least one processor may be configured to collect the image content at intervals of a desired unit time, perform the image clustering based on the collected image content, detect the information about the representative image as the image trend associated with the desired unit time using at least one cluster of the collected image content at the desired unit time, and visualize and provide information about the representative event for each timeline of the desired unit time.

The at least one processor may be configured to search for at least one document associated with the plurality of image content on the Internet, and collect an image included in the retrieved document.

The at least one processor may be configured to collect metadata associated with the image content together with the image content, and label a corresponding cluster using at least one keyword based on an appearance frequency of a keyword included in the metadata for each cluster.

The at least one processor may be configured to select at least one event as the representative event based on at least one of a total number of clusters corresponding to each event and a total number of images corresponding to each event.

The at least one processor may be configured to generate a result based on a total number of images of a representative cluster between the events, and select at least one event as the representative event, the representative event being the event including a largest total number of images.

The at least one processor may be configured to select at least one event as the representative event based on a total number of images of a representative cluster of the at least one event, the representative cluster being a cluster including a largest total number of images among clusters associated with the at least one event, and select at least one image among the images included in the representative cluster of the representative event as the representative image of the representative event.

The at least one processor may be configured to measure a similarity between the images included in the representative cluster and select the representative image based on the measured similarity, or to calculate a feature vector of each of the images included in the representative cluster, calculate an average vector of the calculated feature vectors, and select the representative image based on a distance between the feature vector of each of the images and the average vector.

According to at least one example embodiment, there is provided an apparatus for detecting image trends, the apparatus comprising a memory having computer readable instructions stored thereon, and at least one processor configured to execute the computer readable instructions to receive a plurality of image content from a plurality of image content sources, classify each of the received plurality of image content to at least one image group based on the image content, determine a representative image for the at least one image group based on the image content classified in the at least one image group, receive information related to the at least one image group from the image content source associated with the image content classified in the at least one image group, determine representative information related to the at least one image group based on the received information, and transmit the representative image and the representative information to at least one electronic device.

The plurality of image content sources may include at least one of websites, blogs, and user created content.

The at least one processor may be further configured to classify each of the received plurality of image content to at least one image group by analyzing the received plurality of image content, and determining a similarity score of each of the plurality of image content to image content previously classified in the at least one image group based on results of the analyzing. The classifying each of the received plurality of image content to at least one image group based on the image content may include classifying each of the received plurality of image content to the at least one image group based on the similarity score.

The at least one processor may be further configured to determine representative information related to the at least one image group based on the received information by analyzing the received information for keywords related to the image content classified in the at least one image group, the received information being documents related to the image content, clustering the keywords related to the image content, and determining the representative information based on the clustered keywords.

According to some example embodiments, it is possible to automatically detect an image trend by analyzing image-based content created by a user and to visualize and curate the detected image trend. That is, it is possible to automatically verify an image trend among users by analyzing contents created by the users, and to easily capture definite events or images that draw great attention from users and to use the captured definite events or images for a variety of services.

Also, according to some example embodiments, compared to an analysis system based on use of big data, in interaction with an open-source analysis system, etc., it is possible to reduce and/or minimize system load and system constraints or requirements and to easily analyze an image trend by verifying a current event of interest based on image content created by a user.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
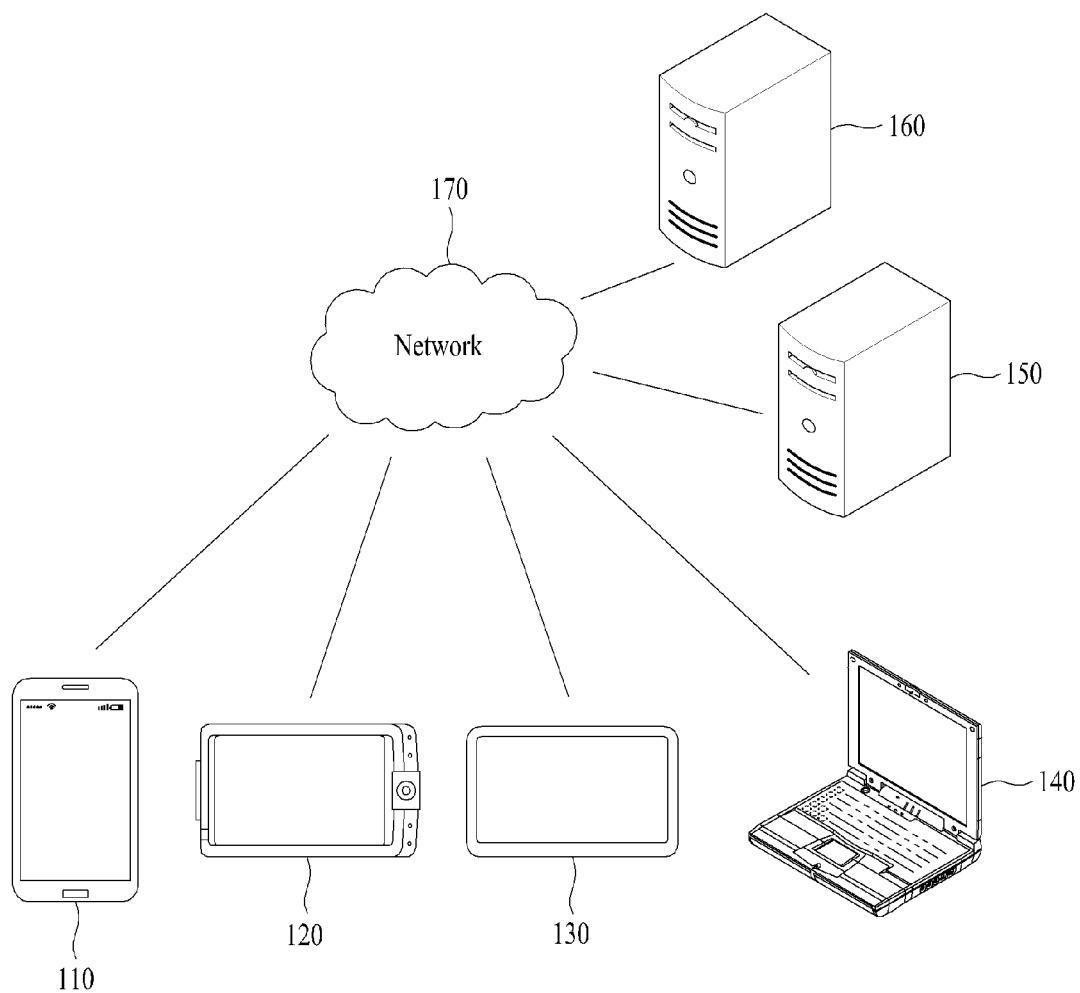
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a personal navigation device, a personal computer (PC), a laptop computer, a digital broadcasting terminal, a personal digital assistant (PDA), a portable multimedia player (PMP), a tablet PC, a wearable device, a smart device, a virtual reality (VR) device, an Internet of Things (IoT) device, and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a satellite network, a radio data network, and/or a broadcasting network. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of at least one program, for example, a browser and/or the installed application, and an operating system (OS) included in the electronic device 110. For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen under control of the application.

According to some example embodiments, the server 150 may automatically verify a current image trend appearing among users by collecting and analyzing image content created by the users, and may visualize and service the detected image trend.

Figure 2:
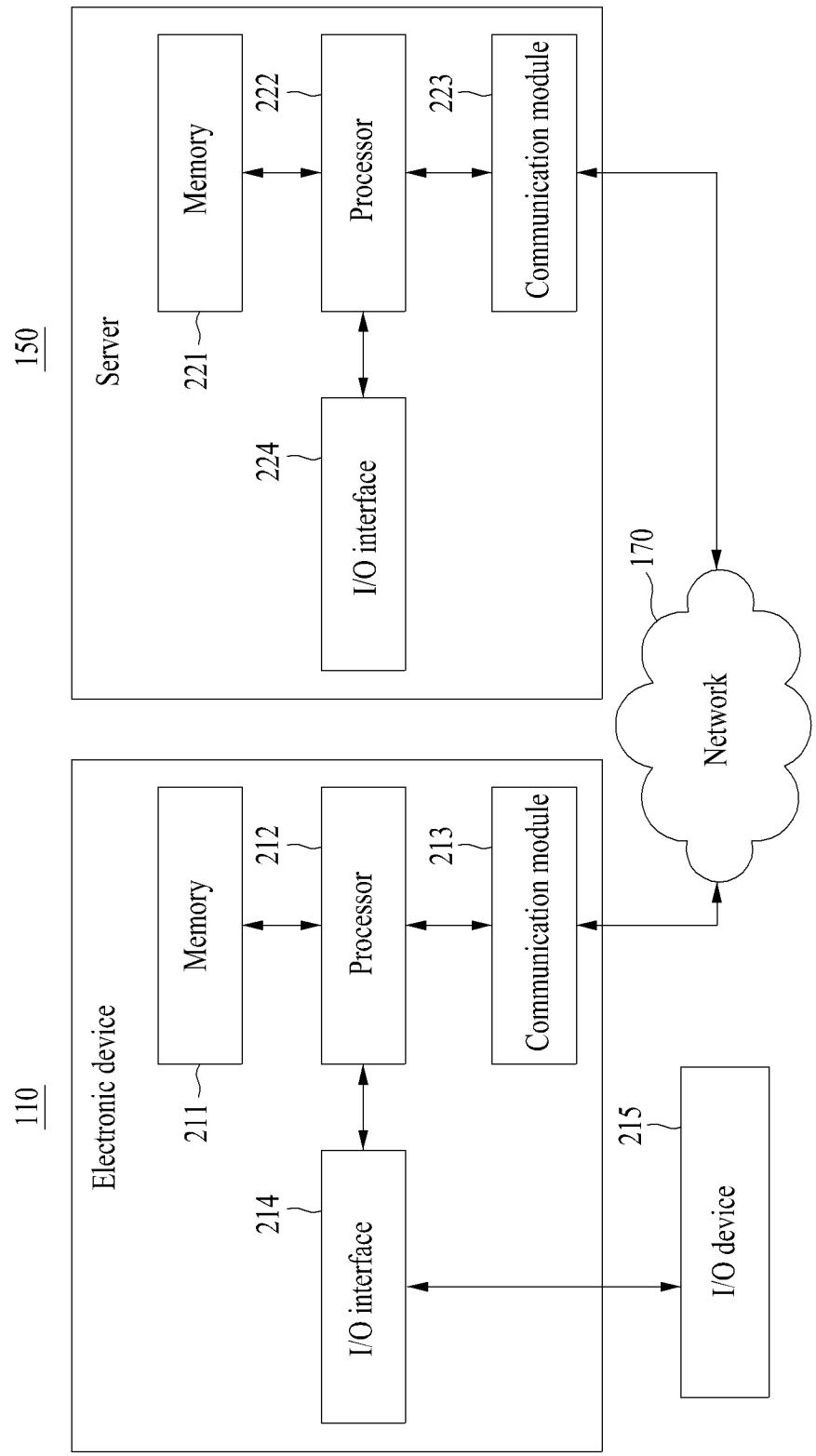
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The electronic devices 120, 130, and 140, and/or the server 160 may have the same or similar configuration to the electronic device 110 and/or the server 150.

Referring to FIG. 2, the electronic device 110 may include a memory 211, at least one processor 212 (hereinafter referred to in the singular form), a communication module 213, and an input/output (I/O) interface 214, and the server 150 may include a memory 221, at least one processor 222 (hereinafter referred to in the singular form), a communication module 223, and an I/O interface 224. The memory 211, 221 may include a permanent mass storage device, such as random access memory (RAM), read only memory (ROM), a hard disk drive, an optical drive, a solid state drive, etc., as a non-transitory computer-readable storage medium. Also, an OS and at least one program code, for example, the aforementioned code for browser or the application installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, that provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received computer readable instructions in response to the program code stored in the storage device such as the memory 211, 222 and thereby transform the processor 212, 222 into a special purpose processor specially programmed to provide the functionality embodied by the instructions.

The communication module 213, 223 may provide a function for communication between the electronic device 110 and the server 150 over the network 170, and may provide a function for communication with another electronic device, for example, the electronic device 120 and/or another server, for example, the server 160. For example, the processor 212 of the electronic device 110 may transfer a request generated based on a program code stored in the storage device, such as the memory 211, to the server 150 over the network 170 under control of the communication module 213. Inversely, a control signal, an instruction, content, file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, data, etc., may be stored in a non-transitory storage medium further includable in the electronic device 110.

The I/O interface 214, 224 may be a device used for interface with an I/O device 215. For example, an input device may include a keyboard, a mouse, a microphone, a camera, etc., and an output device may include a device, such as a display for displaying a communication session of an application, a speaker, a printer, a haptic feedback device, etc. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 and/or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and the like.

The term "image content" used herein may indicate content created based on an image, and may indicate content having an inclusive meaning, for example, a photo, an image captured from video content, an image created by extracting at least a portion of sections from video content, such as GIFs, an image of a point or a section pointed in video content through pick, bookmark, a three-dimensional (3D) image, a VR image, a hologram, a document, a graphical design, a logo, an animation, a drawing, and the like. As another example, the image content may indicate content that is created by directly photographing, for example, capturing an image of a concert, a fan meeting, a festival, etc., based on a variety of events. The image content may serve as a highlight of a specific event. In this aspect, the image content may be used to verify an event that is currently being talked, discussed, written about, blogged about, messaged about, etc., among users, a scene that attracts many users in a corresponding event, and the like. The term "event" used herein may indicate an occasion, activity, time and/or place that may trigger creation of image content. Also, the event may inclusively indicate a video and any type of targets that may become an issue to users, such as a pre-notified, desired, and/or defined target, a subject, an object, a specific scene, event, and/or incident, a thing, a service, and the like. That is, the image content may be derived from a given video, such as a broadcast program, and/or may be created by directly photographing, by a user, a specific target or creating a specific target, etc.

Hereinafter, example embodiments using video content as a representative example will be described, however the example embodiments are not limited thereto.

Figure 3:
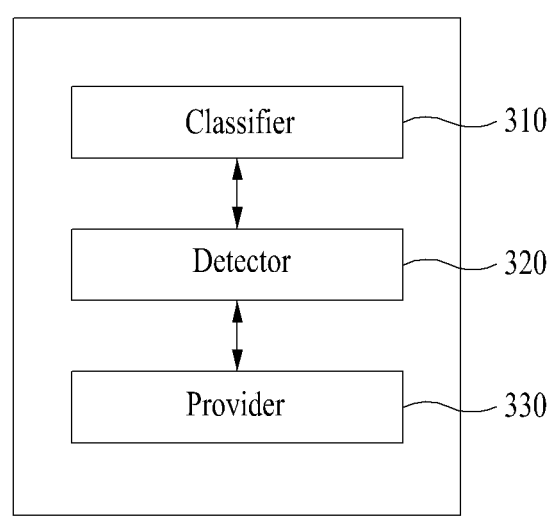
FIG. 3 is a block diagram illustrating an example of constituent elements included in a processor of a server according to at least one example embodiment.
Figure 4:
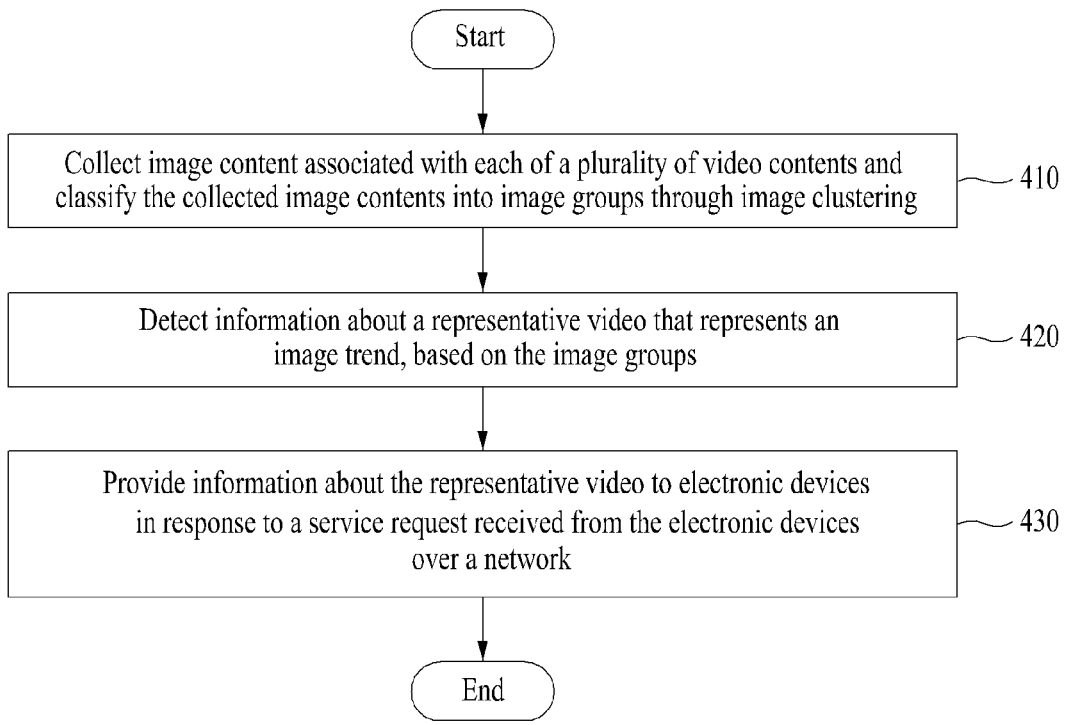
FIG. 4 is a flowchart illustrating an example of a method performed at a server according to at least one example embodiment.

FIG. 3 is a block diagram illustrating an example of constituent elements included in at least one processor of a server according to at least one example embodiment, and FIG. 4 is a flowchart illustrating an example of a method performed at a server according to at least one example embodiment. Referring to FIG. 3, the processor 222 of the server 150 may include a classifier 310, a detector 320, and a provider 330. The constituent elements of the processor 222 may control the server 150 to perform operations 410 through 430 included in the method of FIG. 4, and may be configured to execute a code of at least one program and an OS included in the memory 221.

In operation 410, the server 150 may collect image content associated with each of a plurality of video contents and may classify the collected image contents into an image group (hereinafter, also referred to as a cluster) through image clustering. The classifier 310 may control the server 150 to perform operation 410. For example, the server 150 may search for a document, website article, blog post, social media post, forum comments, etc., associated with a specific video on the Internet, may collect an image included in the retrieved document, website article, blog post, social media post, forum comments, etc., as image content associated with a corresponding event, and may automatically classify the collected image into a similar image group through image clustering.

Figure 6:
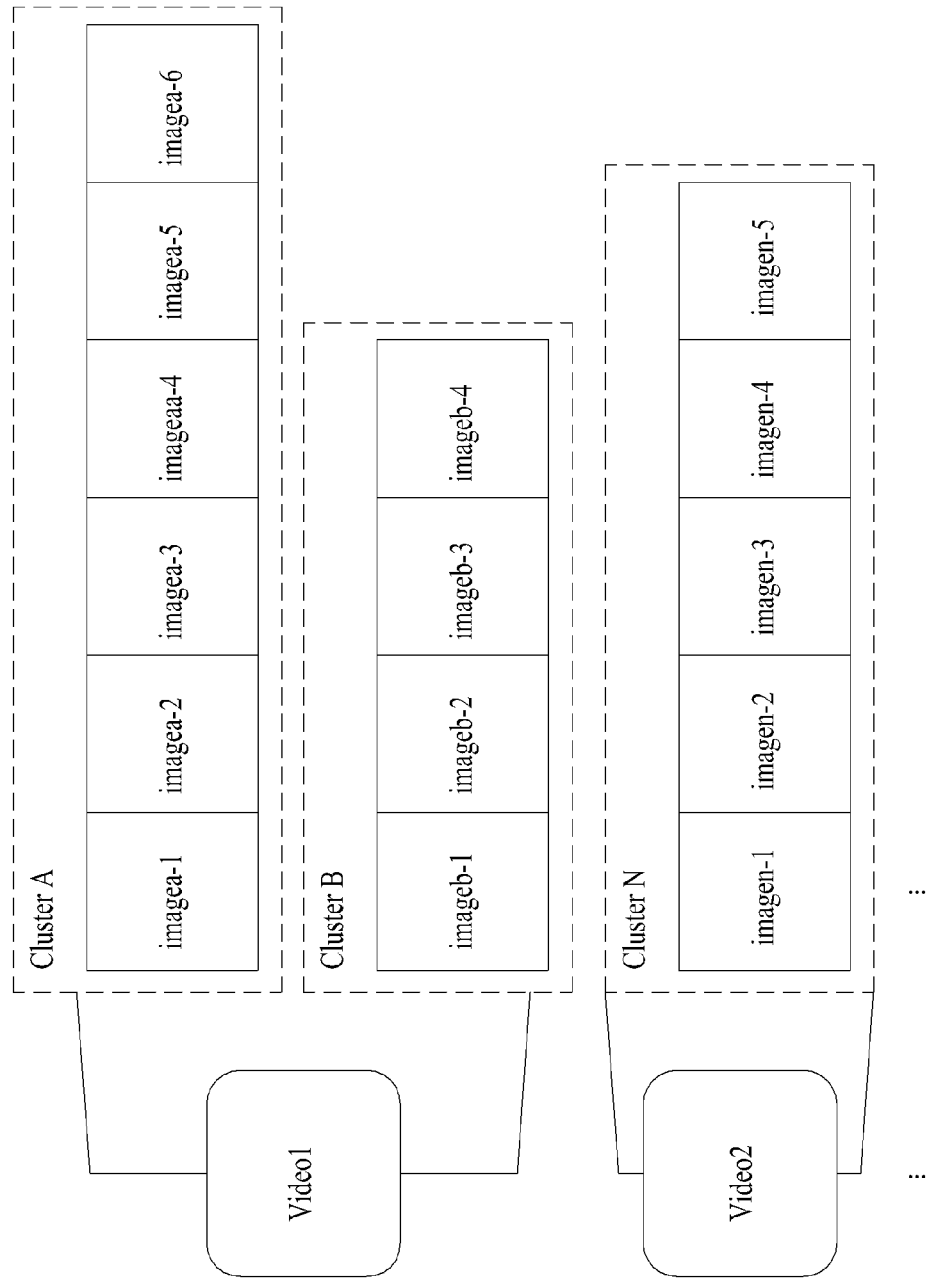
FIGS. 6 through 7 illustrate examples of an image clustering process according to at least some example embodiments.
Figure 7:
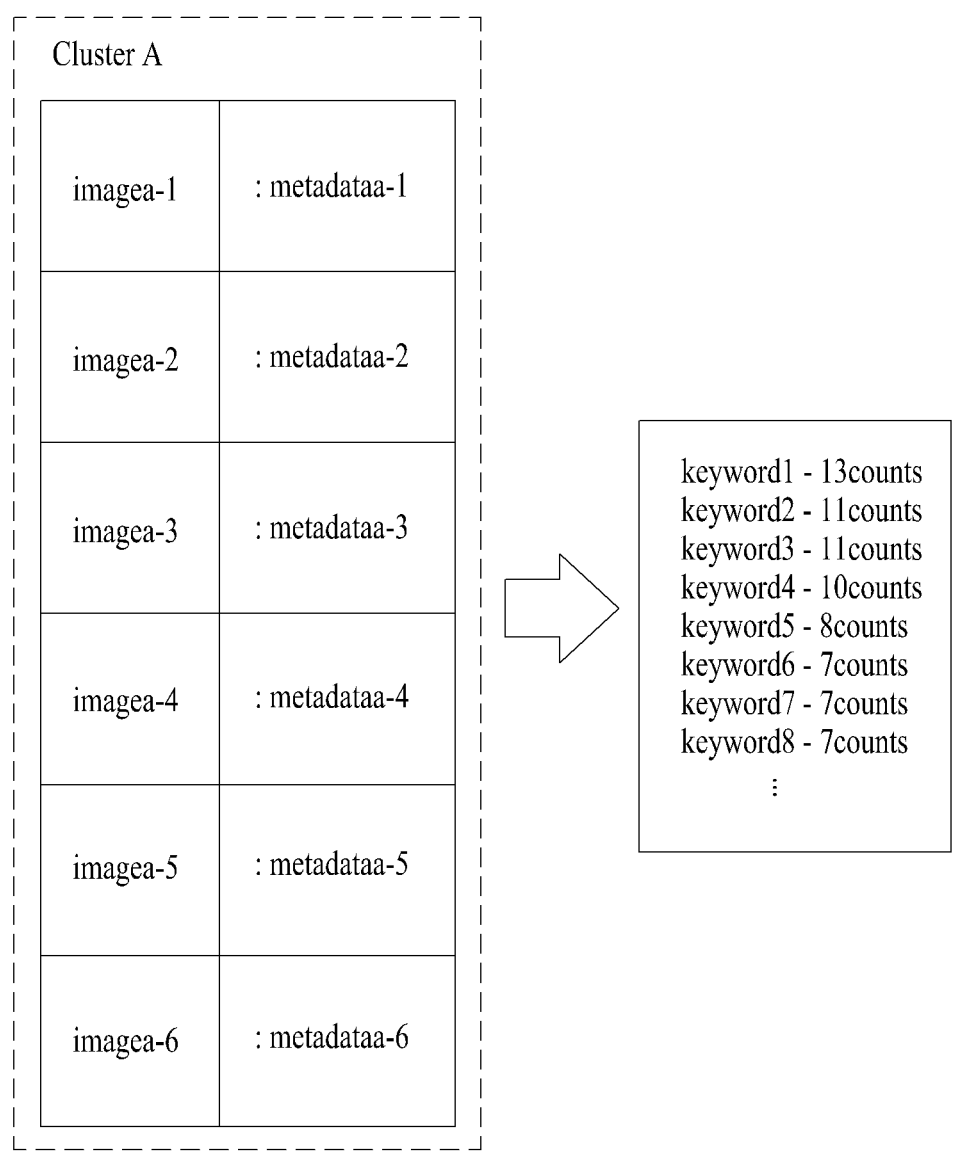

An image clustering method will be further described with reference to FIGS. 5 through 7.

In operation 420, the server 150 may detect and/or determine information about a representative video that represents an image trend, based on the image group, that is, a cluster into which the image content is classified. The detector 320 may control the server 150 to perform operation 420. For example, the server 150 may detect and/or determine information about a video that is being discussed, posted, written, messaged, and/or talked about among users as an image trend, based on at least one of a number of clusters for each piece of video content and a number of images for each cluster. Additionally, other factors may be considered when detecting or determining an image trend, such as the frequency of videos/posts/etc. being transmitted online, the length of time between videos/posts/etc., how long the videos/posts/etc., are discussed, talked about, etc., the geographical location of the users discussing, talking about, etc., the representative video, and the like.

An image trend detection method will be further described with reference to FIGS. 8 through 12.

In operation 430, in response to a service request received from an electronic device over a network, the server 150 may provide information about the representative video detected in operation 420 to the electronic device. That is, the server 150 may visualize service information regarding the video detected as the image trend to the electronic device. The provider 330 may control the server 150 to perform operation 430.

Figure 5:
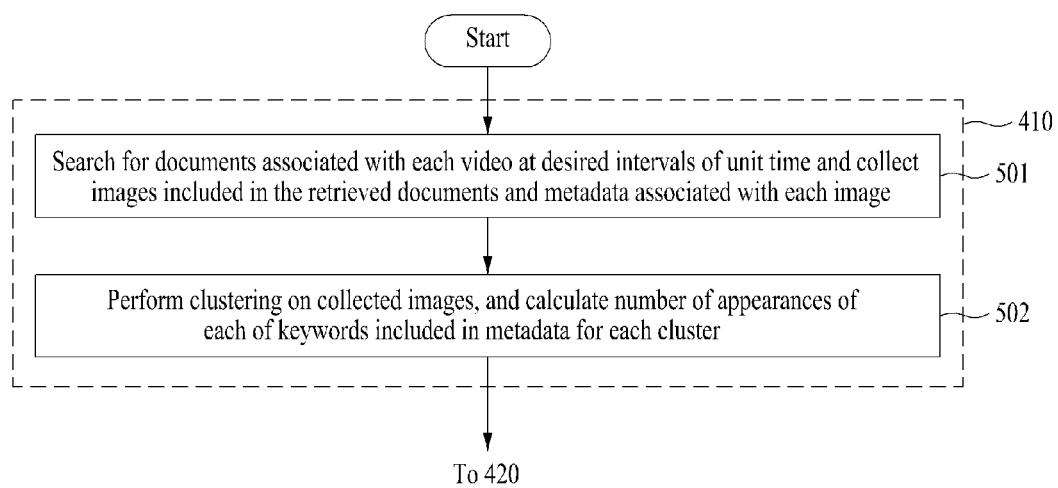
FIG. 5 is a flowchart illustrating an example of an image clustering method according to at least one example embodiment.

FIG. 5 is a flowchart illustrating an example of an image clustering method according to at least one example embodiment. The method of FIG. 5 may be included in operation 410 of FIG. 4.

In operation 501, the server 150 may search for a document, website article, blog post, social media post, forum comment, instant message, chat message, emails, etc., (hereinafter collectively referred to as "document") associated with each video at intervals of a desired unit time and may collect images included in the retrieved document and metadata associated with each image. Here, the document may indicate user content such as user generated content (UGC), and may be a document registered on a variety of communities, for example, websites, forums, blogs, cafes, social media networks, web portals, etc. As another example, the document may include a document on an affiliated database system, for example, a search engine and the like, that communicates with the server 150. The unit time refers to a temporal interval from a desired and/or preset point in time to another point in time and may be determined as a unit, such as 1 minute, 1 hour, 1 day, 1 week, 1 month, and the like. For example, the server 150 may collect image content associated with a corresponding video based on information about video content corresponding to a desired unit time. For example, in the case of a broadcast program, the server 150 may search for relevant images by combining a broadcast name (e.g., television program title, episode title, popular nickname or abbreviation for the broadcast program, etc.) and/or an event name (e.g., sporting event name, concert name, etc.) of a corresponding date, a celebrity name (e.g., actor name, actress name, director name, writer name, character name, sports team name, athlete name, band name, musician name, etc.), and the like. Metadata collected together with an image may include a title, a tag, a relevant text, time/date information, geographical location information of where the image was taken and/or where it was uploaded from, information regarding the user uploading and/or posting the image, and the like, set to the document or the image, and may include a full text included in the document.

In operation 502, the server 150 may perform clustering of grouping similar images among the collected images, and may calculate a number of appearances (e.g., a keyword appearance frequency) of each of the keywords included in the metadata of an image for each cluster. Through clustering, image contents collected in association with each of the video contents may be classified into one or more clusters. For example, referring to FIG. 6, images collected in association with video 1 may be classified into two clusters, for example, cluster A and cluster B, and images collected in association with video 2 may be classified into a single cluster, for example, cluster N. A clustering scheme may employ a known art and each cluster may include, for example, images having an image similarity within an error range (e.g., a margin of error) based on one or more criteria, such as each image containing the same and/or similar subject (e.g., a person, an animal, etc.) and/or object (e.g., location, background, event, etc.) depicted, similarity of meta information, similarity in date and/or time, similarity in geolocation, etc. Referring to FIG. 7, if cluster A includes six images, for example, imagea-1, imagea-2, imagea-3, imagea-4, imagea-5, and imagea-6, keywords, for examples, keyword1, keyword2, . . . , associated with cluster A may be collected based on metadata, for example, metadataa-1, metadataa-2, metadataa-3, metadataa-4, metadataa-5, and metadataa-6, collected together with the respective images. Here, an appearance frequency of each of the keywords included in metadata for each cluster may be calculated.

Figure 8:
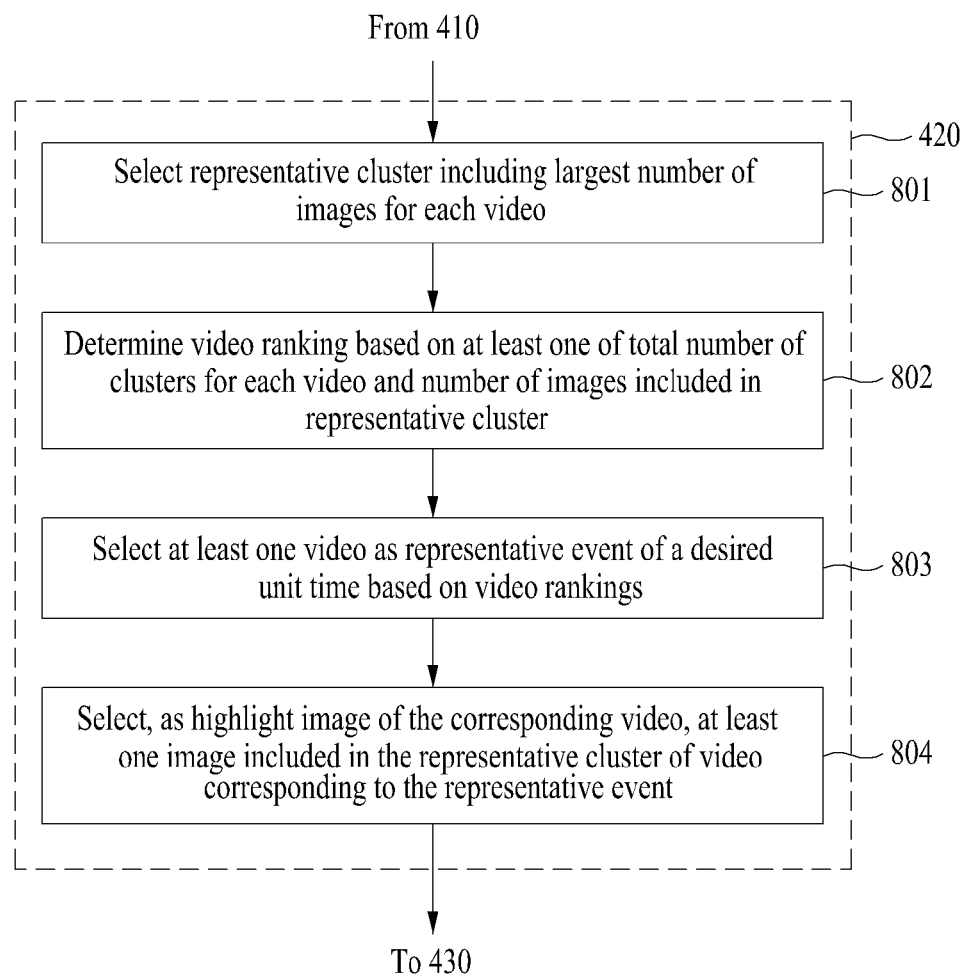
FIG. 8 is a flowchart illustrating an example of an image trend detection method according to at least one example embodiment.

FIG. 8 is a flowchart illustrating an example of an image trend detection method according to at least one example embodiment. The method of FIG. 8 may be included in operation 420 of FIG. 4.

Figure 9:
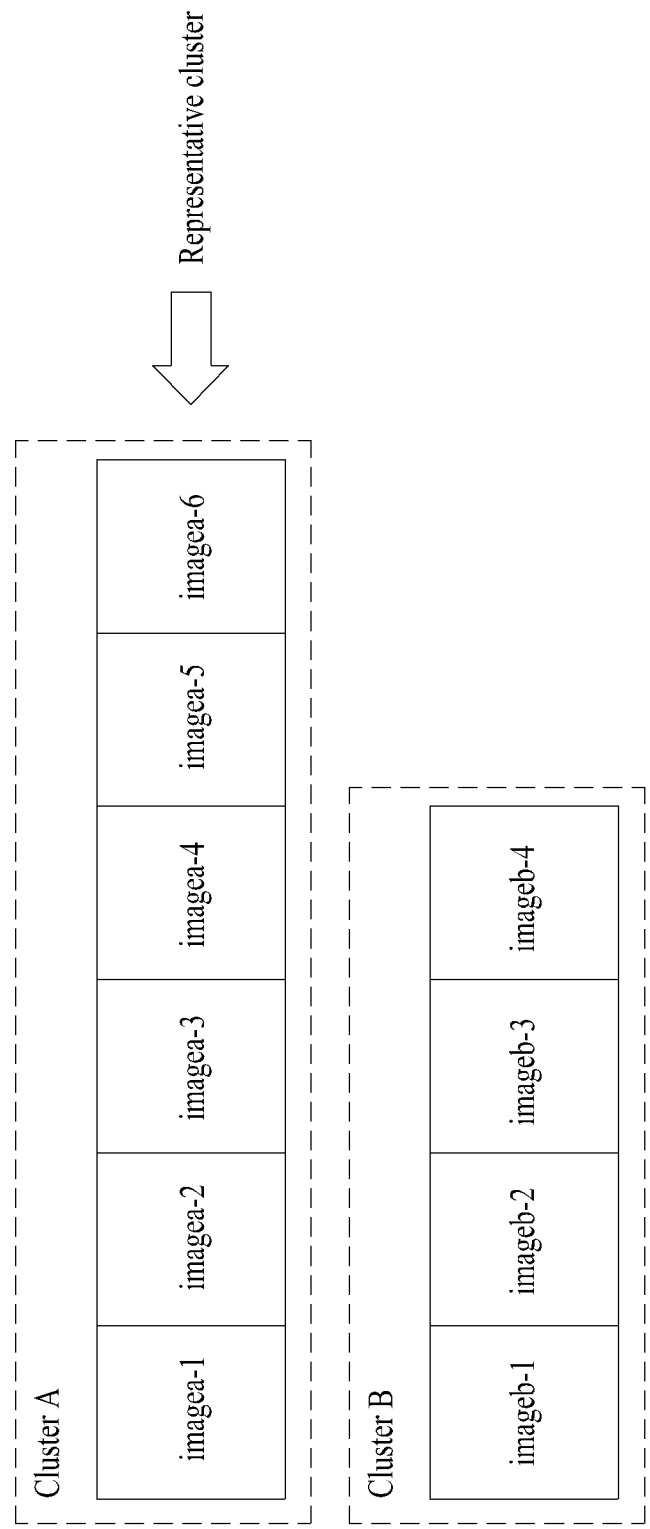
FIGS. 9 through 12 illustrate examples of an image trend detection process according to at least some example embodiments.

In operation 801, the server 150 may select at least one cluster as a representative cluster based on various desired criteria, such as the number of images for each video included in the cluster, the popularity of images included in the cluster (e.g., the number of times that an image and/or one or more of the images included in the cluster has been viewed, downloaded, visited, forwarded, shared, discussed, talked about, etc.), etc. For example, the server 150 may define, as a representative cluster, a cluster in which a large number of images are grouped in a desired unit time with respect to each video. Referring to FIG. 9, as another example, if images collected in association with a specific video are classified into cluster A and cluster B, cluster A that is a cluster including a largest number of images may be determined as a representative cluster of the video between the two clusters, cluster A and cluster B.

In operation 802, the server 150 may determine a video ranking based on at least one of a total number of clusters for each video, a number of images included in the representative cluster, a popularity of the images included in the cluster, etc. For example, the server 150 may verify a number of images of the representative cluster with respect to each video and may determine video rankings in descending order of the verified number of images of the representative cluster. That is, the server 150 may determine a video ranking based on the representative cluster in which a largest number of similar images are grouped in a desired unit time. As another example, the server 150 may determine a video ranking by combining a total number of clusters grouped for each video and a number of images for each cluster. That is, a video corresponding to a relatively large number of clusters (in comparison to other clusters and/or in comparison to a desired threshold number that may be determined based on experimental studies) and a relatively large number of images included in a representative cluster of the video may be determined to have a relatively upper ranking (e.g., a high ranking). For example, among videos having the same (or similar) number of images included in the respective representative clusters, a different criterion may be used to determine which video is higher ranked, such as determining that a video having a relatively greater total number of clusters may be determined to have a relatively upper ranking, etc.

Figure 10:
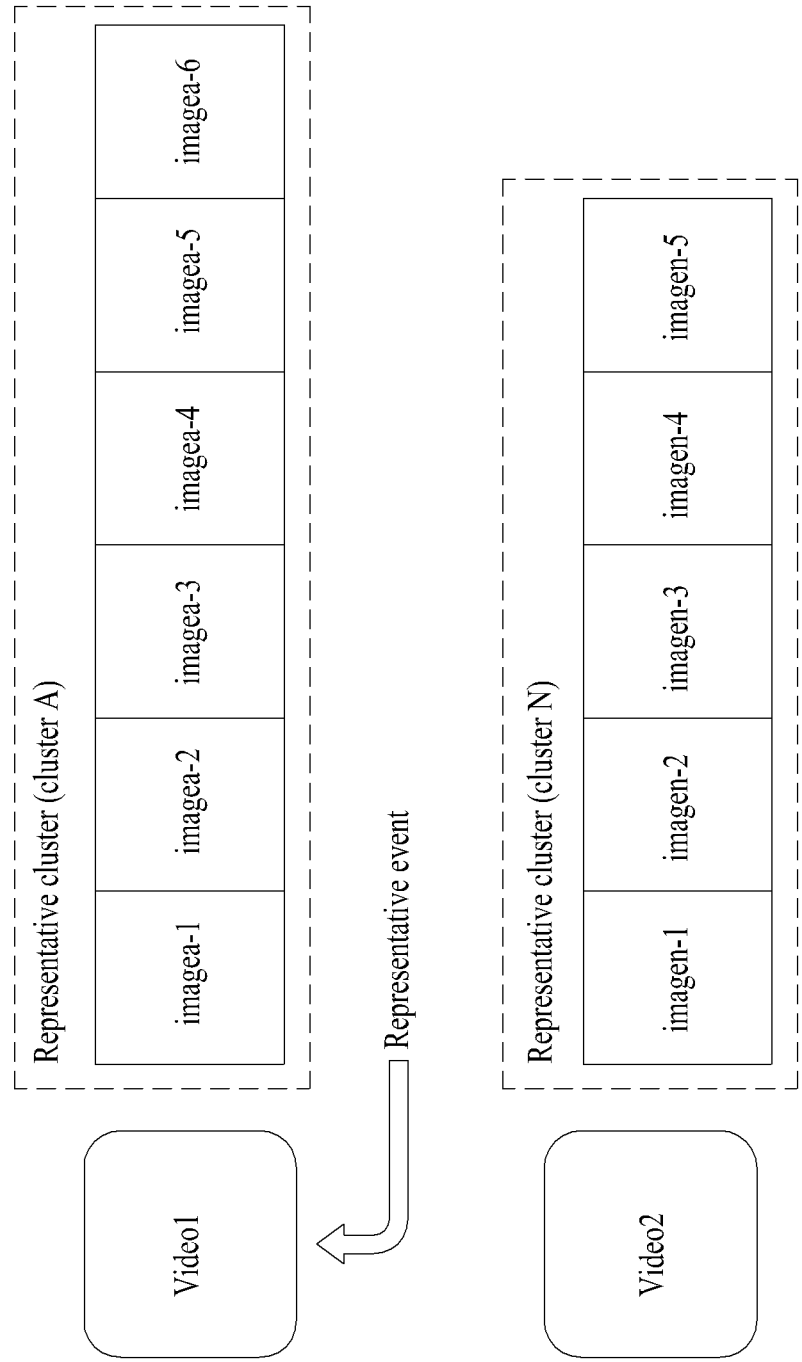
Figure 11:
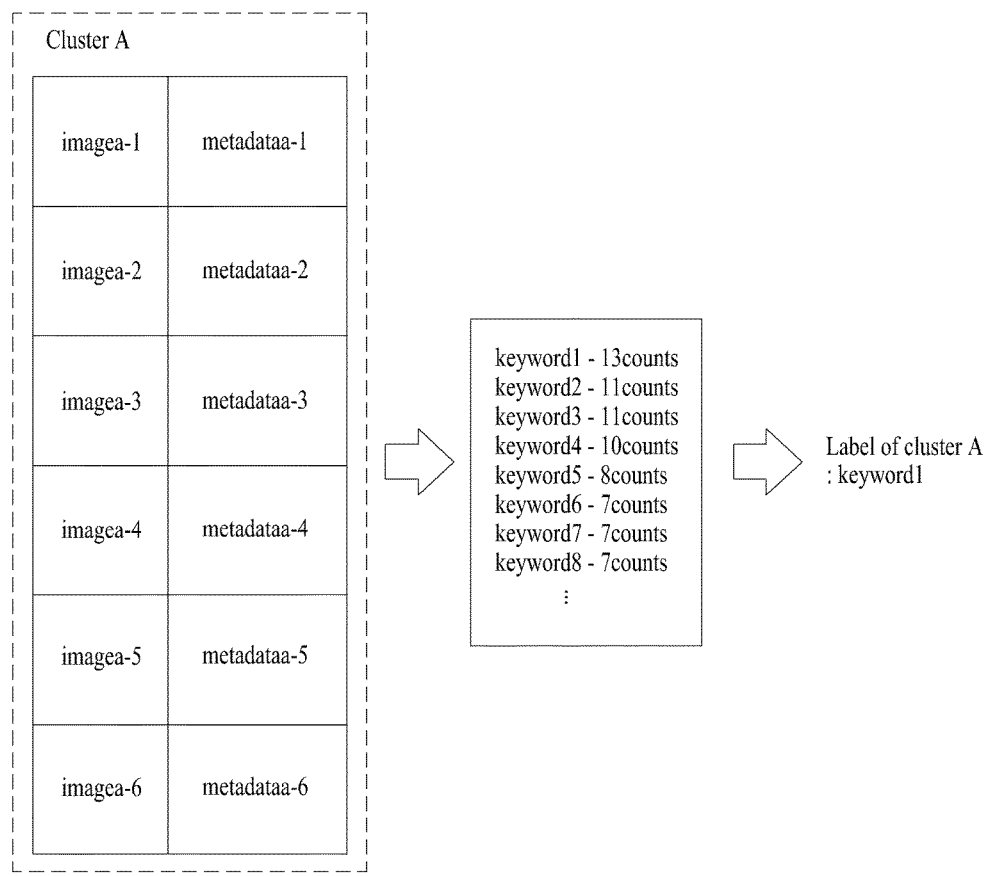

In operation 803, the server 150 may select at least one video as a representative event of a desired unit time based on the video rankings determined in operation 802. For example, the server 150 may select a video with a top ranking from among videos as a representative video and may define the selected video as a representative event that represents an image trend of a corresponding period, or the server 150 may select a plurality of videos, each video with a top ranking (for example, the top 5 or top 10 ranked videos) as the selected videos, etc. For example, the server 150 may select, as a representative event, a video that includes a largest number of images in a representative cluster or a video that includes a largest number of images in a representative cluster and also includes a largest total number of clusters from among the plurality of videos, etc. Referring to FIG. 10, if a representative cluster of video 1 includes six images and a representative cluster of video 2 includes five images, video 1 may be selected as a representative event.

The server 150 may select at least one keyword based on an appearance frequency of at least one keyword (or phrase of keywords) included in metadata for each cluster and may label a corresponding cluster with the selected at least one keyword. For example, referring to FIG. 11, the server 150 may label cluster A with a word, for example, 'keyword1' corresponding to a largest appearance frequency based on a keyword-by-keyword appearance frequency of cluster A. That is, the server 150 may label a cluster based on a word corresponding to a largest appearance frequency in a text included in metadata of the cluster.

Figure 12:
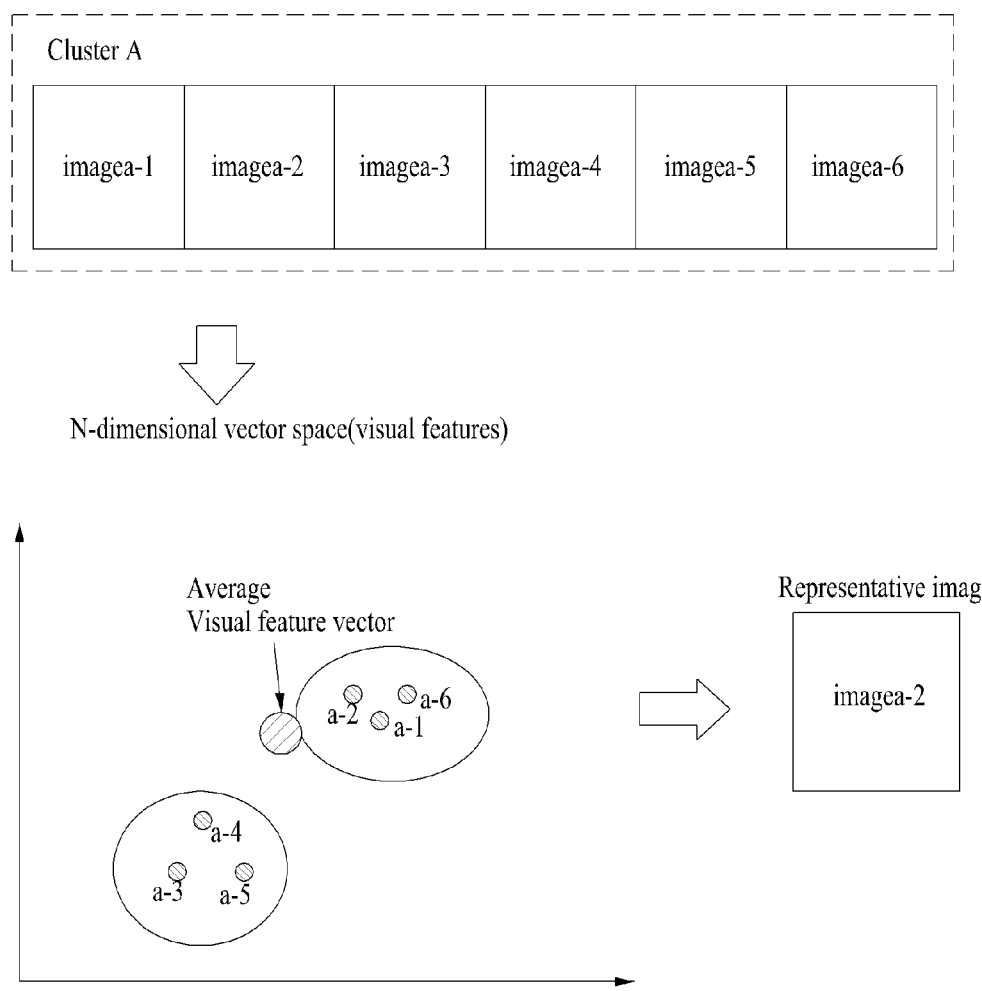

In operation 804, the server 150 may select, as a highlight image (e.g., a representative image) of a corresponding video, at least one image included in a representative cluster of a video corresponding to the representative event. The server 150 may select a highlight scene based on images included in the representative cluster for each video in addition to the representative event. The server 150 may define an image of a cluster in which a largest number of images are grouped among clusters labeled with a specific event as a most important and meaningful scene of the corresponding event. For example, the server 150 may measure an image similarity between images included in a cluster and may select at least one image as a highlight image in a video. The server 150 may calculate a visual feature vector of each of images included in a cluster based on a feature extraction scheme, for example, a global color histogram, a local color histogram, a gray level co-occurrence matrix, a wavelet transform or a gabor wavelet transform, an edge direction histogram, deep learning based features, and the like. Referring to FIG. 12, a visual feature vector of each image may be represented on an N-dimensional vector space. A distance between vectors on the N-dimensional vector space may appear to be close according to an increase in a similarity between the images. The server 150 may average visual feature vectors of all images included in a cluster and may select an image having a smallest distance from the average vector based on the average visual feature vector on the N-dimensional vector space as a representative image, that is, a highlight image, of the corresponding cluster.

Figure 13:
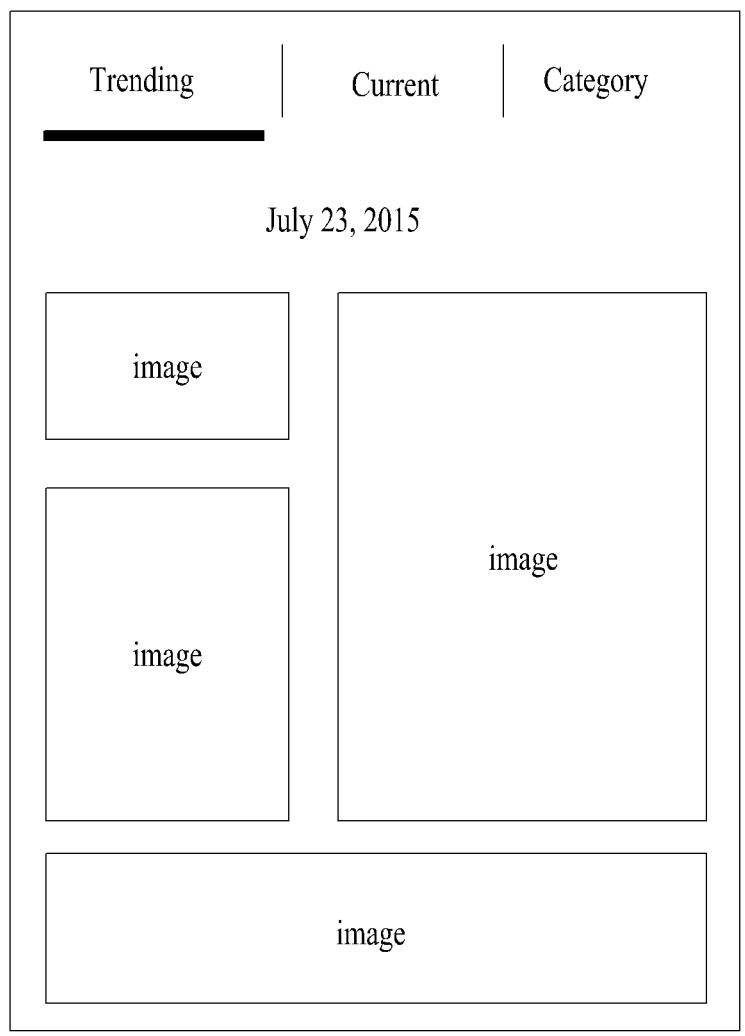
FIG. 13 illustrates an example of a process of visualizing an image trend according to at least one example embodiment.

The server 150 may select a representative image and a representative event of a corresponding period by analyzing image contents collected in a desired unit time and may detect the selected representative event and representative image as an image trend of the corresponding period. In response to a service request from a user through an electronic device, the server 150 may visualize (e.g., provide information regarding the representative event in visual form) and provide the representative event and the representative image analyzed as the image trend to be verifiable on the electronic device. For example, referring to FIG. 13, the server 150 may post a representative event and a representative image detected as an image trend of a specific period for each timeline of a desired unit time using a graphical user interface. The server 150 may provide information about a most popular event among users by analyzing the image trend and may provide highlight summarization about the event, either visually using the images included in the clusters associated with the video, or textually using the associated metadata information of the images included in the clusters, etc. Additionally, the visualization may take the form of a timeline, photo album, board, grouping, graph, and/or other visual illustration that depicts a plurality of representative images, representative clusters, and/or representative events in a chronological order, in an order of popularity, in an order of most content (e.g., most images, clusters, and/or videos, etc.), in an order based on an estimated or predicted desirability or relevance to the user based on previous experimental data, etc. The visualization of the representative images may also take the form of a map based on the geolocation information collected from the metadata of the collected images that indicates the location of the image trends. However, the example embodiments are not limited thereto, and other visualizations may be provided.

While various example embodiments have been discussed with reference to automatically detecting an image trend in videos, the example embodiments are not limited thereto and may be applied to any type of image, such as a photo, an image captured from video content, an image created by extracting at least a portion of sections from video content, such as GIFs, an image of a point or a section pointed in video content through pick, bookmark, a three-dimensional (3D) image, a VR image, a hologram, a document, a graphical design, a logo, an animation, a drawing, etc.

According to some example embodiments, it is possible to automatically detect an image trend by analyzing image-based content created by one or more users and to visualize and curate the detected image trend. That is, it is possible to automatically verify an image trend among users by analyzing content created by the users, and to easily capture definite events or images that draw a great amount of attention from users and to use the captured definite event or images for a variety of services. Also, according to some example embodiments, compared to an analysis system that utilizes big data, in interaction with an open-source analysis system, etc., it is possible to reduce and/or minimize system load and system constraints and/or requirements and to easily analyze an image trend by verifying a current event of interest based on image content created by at least one user.

The units described herein may be implemented using hardware components, or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method performed by a server, the method comprising:
   collecting, using at least one processor of the server, a plurality of image content from a plurality of electronic devices, the plurality of image content associated with at least one event;
   performing, using the at least one processor, image clustering with respect to the plurality of image content associated with the at least one event;
   detecting, using the at least one processor, information about a representative event that represents an image trend based on a representative cluster according to the image clustering;
   selecting, using the at least one processor, at least one image among the images included in the representative cluster of the representative event as the representative image of the representative event, the selecting including,
      calculating a feature vector of each of the images included in the representative cluster,
      calculating an average vector of the calculated feature vectors, and
      selecting the representative image based on a distance between the feature vector of each of the images and the average vector; and
   transmitting, using the at least one processor, the detected information about the representative event and the selected representative image to at least one electronic device of the plurality of electronic devices in response to a service request regarding the representative event received from the at least one electronic device over a network.

2. The method of claim 1, wherein the performing of the image clustering comprises searching for a plurality of documents associated with the event on the Internet, and collecting at least one image included in the retrieved plurality of documents.

3. The method of claim 1, wherein
   the event is video content; and
   the performing of the image clustering comprises
      searching for a plurality of documents associated with the video content on the Internet, and
      collecting at least one image included in the retrieved plurality of documents.

4. The method of claim 1, wherein the performing of the image clustering comprises:
   collecting metadata associated with the image content; and
   labeling a corresponding cluster using at least one keyword based on an appearance frequency of the at least one keyword included in the collected metadata.

5. The method of claim 1, wherein the detecting comprises selecting at least one event as the representative event based on at least one of a total number of clusters corresponding to each event and a total number of images corresponding to each event.

6. The method of claim 1, wherein the detecting comprises:
   generating a result based on a total number of images of the representative cluster between the events; and
   selecting at least one event as the representative event, the representative event being the event including a largest total number of images.

7. The method of claim 1, wherein
   the performing of the image clustering comprises
      collecting the image content at intervals of a desired unit time, and
      performing the image clustering at the desired unit time; and
   the detecting comprises detecting information about the representative image as the image trend associated with the desired unit time using a cluster of the image content collected at the desired unit time.

8. The method of claim 7, wherein the transmitting comprises visualizing and transmitting information about the representative event for each timeline of the desired unit time.

9. The method of claim 1, wherein the detecting comprises:
   selecting at least one event as the representative event based on a total number of images of the representative cluster, the representative cluster being a cluster including a largest total number of images among clusters for each event.

10. The method of claim 9, wherein the selecting as the representative image of the representative event comprises:
    measuring a similarity between images included in the representative cluster; and
    selecting the representative image based on the measured similarity.

11. A server system comprising:
    a memory having computer readable instructions stored thereon; and
    at least one processor configured to execute the computer readable instructions to,
       collect a plurality of image content from a plurality of electronic devices, the plurality of image content associated with at least one event;
       perform image clustering with respect to the plurality of image content associated with the at least one event;
       detect information about a representative event that represents an image trend based on a representative cluster according to the image clustering;
       select at least one image among the images included in the representative cluster of the representative event as the representative image of the representative event, the selecting including,
          calculating a feature vector of each of the images included in the representative cluster,
          calculating an average vector of the calculated feature vectors, and
          selecting the representative image based on a distance between the feature vector of each of the images and the average vector; and
       transmit the detected information about the representative event and the selected representative image to an electronic device in response to at least one electronic device of the plurality of electronic devices in response to a service request regarding the representative event received from the at least one electronic device over a network.

12. The system of claim 11, wherein the at least one processor is configured to:
    collect the image content at intervals of a desired unit time;
    perform the image clustering based on the collected image content;
    detect the information about the representative image as the image trend associated with the desired unit time using at least one cluster of the collected image content at the desired unit time; and visualize and provide information about the representative event for each timeline of the desired unit time.

13. The system of claim 11, wherein the at least one processor is configured to:
search for at least one document associated with the plurality of image content on the Internet; and
collect an image included in the retrieved document.

14. The system of claim 11, wherein the at least one processor is configured to:
collect metadata associated with the image content together with the image content; and
label a corresponding cluster using at least one keyword based on an appearance frequency of a keyword included in the metadata for each cluster.

15. The system of claim 11, wherein the at least one processor is configured to select at least one event as the representative event based on at least one of a total number of clusters corresponding to each event and a total number of images corresponding to each event.

16. The system of claim 11, wherein the at least one processor is configured to:
generate a result based on a total number of images of the representative cluster between the events; and
select at least one event as the representative event, the representative event being the event including a largest total number of images.

17. The system of claim 11, wherein the at least one processor is configured to:
select at least one event as the representative event based on a total number of images of the representative cluster of the at least one event, the representative cluster being a cluster including a largest total number of images among clusters associated with the at least one event.

18. The system of claim 17, wherein the at least one processor is configured to:
measure a similarity between the images included in the representative cluster, and
select the representative image based on the measured similarity.

19. An apparatus for detecting image trends, the apparatus comprising:
a memory having computer readable instructions stored thereon; and
at least one processor configured to execute the computer readable instructions to,
receive a plurality of image content from a plurality of image content sources, the plurality of image content sources being a plurality of electronic devices;
classify each of the received plurality of image content to at least one image group based on the image content;
determine a representative image for the at least one image group based on the image content classified in the at least one image group, the determining including,
calculating a feature vector of each of the images included in the at least one image group,
calculating an average vector of the calculated feature vectors, and
determining the representative image based on a distance between the feature vector of each of the images and the average vector;
receive information related to the at least one image group from the image content source associated with the image content classified in the at least one image group;
determine representative information related to the at least one image group based on the received information; and
transmit the representative image and the representative information to at least one electronic device of the plurality of image content sources in response to a service request received from the at least one electronic device over a network.

* * * * *